United States Patent
Natisin et al.

(10) Patent No.: US 11,359,613 B1
(45) Date of Patent: Jun. 14, 2022

(54) ELECTROSPRAY THRUSTER WITH INVERTED GEOMETRY

(71) Applicant: Government of the United States, as represented by the Secretary of the Air Force, Wright-Patterson AFB, OH (US)

(72) Inventors: Michael Ryan Natisin, Palmdale, CA (US); Zachary Andrew Holley, Helendale, CA (US)

(73) Assignee: United States of America as represented by the Secretary of the Air Force, Wright-Patterson AFB, OH (US)

(*) Notice: Subject to any disclaimer, the term of this patent is extended or adjusted under 35 U.S.C. 154(b) by 229 days.

(21) Appl. No.: 16/889,998

(22) Filed: Jun. 2, 2020

(51) Int. Cl.
*F03H 1/00* (2006.01)
*B64G 1/40* (2006.01)

(52) U.S. Cl.
CPC ........... *F03H 1/0056* (2013.01); *B64G 1/405* (2013.01)

(58) Field of Classification Search
CPC ........ F03H 1/005; F03H 1/0056; B64G 1/405
See application file for complete search history.

(56) References Cited

U.S. PATENT DOCUMENTS

| | | | |
|---|---|---|---|
| 9,638,178 B1 | 5/2017 | Courtney et al. | |
| 2020/0340459 A1* | 10/2020 | Buldrini | F03H 1/005 |

OTHER PUBLICATIONS

Courtney, Daniel G., Dandavino, Simon and Shea, Herbert "Comparing direct and indirect thrust measurements from passively fed ionic electrospray thrusters." Journal of Propulsion and Power 32.2, 2016: 392-407.
Lozano, Paulo, and Courtney, Daniel, G. "On the development of high specific impulse electric propulsion thrusters for small satellites." Madeira, Portugal, May 31, 2010.
Lozano, P. C., Wardle, B. L., Moloney, P., & Rawal, S. Nanoengineered thrusters for the next giant leap in space exploration. MRS Bulletin, 40(10), (2015) 842-849.
Ma, Chengyu and Ryan, Charles N. The Design and Characterization of a Porous-emitter Electrospray Thruster (PET-100) for Interplanetary CubeSats. Proceedings of iCubeSat 2018, the 7th Interplanetary CubeSat Workshop, Paris, France May 25, 2018, 1-9.
(Continued)

*Primary Examiner* — Arun Goyal
*Assistant Examiner* — William L Breazeal
(74) *Attorney, Agent, or Firm* — AFMCLO/JAZ; James F. McBride

(57) ABSTRACT

The present invention relates to electrospray thrusters, processes of making electrospray thrusters, and methods of using such electrospray thrusters. Applicant's thruster incorporates a unique geometry for the emitters and extractor grid that effectively eliminates ion interception on the grid, which is the primary failure mechanism of current devices, yet maintains the electric field conditions necessary for ion emission to occur. Without grid impingement, the thrust produced by the thruster is increased and thruster operational lifetime is increased substantially. Additionally, this non-traditional geometry also allows for higher electric fields at the emitter tip for a given applied voltage, thus enabling lower operational voltage of the thruster as compared to conventional designs.

20 Claims, 6 Drawing Sheets
(2 of 6 Drawing Sheet(s) Filed in Color)

(56) References Cited

OTHER PUBLICATIONS

Coffman, C.; Perna, L., Li, H.; Lozano, P. C.; On the Manufacturing and Emission Characteristics of a Novel Borosilicate Electrospray Source, Joint Propulsion Conferences 49th AIAA/ASME/SAE/ASEE Joint Propulsion Conference, 2013, 1-12.

* cited by examiner

ELECTROSPRAY THRUSTER WITH INVERTED GEOMETRY

RIGHTS OF THE GOVERNMENT

The invention described herein may be manufactured and used by or for the Government of the United States for all governmental purposes without the payment of any royalty.

FIELD OF THE INVENTION

The present invention relates to electrospray thrusters, processes of making electrospray thrusters, and methods of using such electrospray thrusters.

BACKGROUND OF THE INVENTION

In order to increase flexibility and reduce costs for in-space operations, recent trends in mission design have transitioned away from using small numbers of large satellites towards the use of large numbers of small satellites. This fundamental change in mission architecture has led to a similarly dramatic change in the characteristics desired from the spacecraft propulsion systems used on these satellites. Due to the smaller size, the propulsion systems are required to have much lower mass, volume, and power consumption. Among the most promising technologies available to satisfy these new propulsion requirements is electrospray thruster technology. Electrospray thrusters are devices that use electric fields to accelerate liquid propellant to high velocities, thus providing thrust to the attached spacecraft.

The primary issue facing electrospray thrusters is that the lifetimes currently achieved are small compared to those necessary for the majority of in-space operations. This lifetime is primarily limited by impingement of the emitted ions upon the extractor grid electrode, which in-turn results in material deposition upon the extractor grid surface. This grid impingement dramatically reduces the performance of the thruster since no thrust is produced by the impinged ions. More significantly, over time the material deposition resulting from the impingement becomes sufficient to form a conductive path between one or more emitters and the extractor grid, making it no longer possible to enforce a potential difference between them and therefore resulting in thruster failure.

Applicants recognized the problem of grid impingent could be eliminated by utilizing a unique geometry for the emitters and extractor grid in which the grid was removed from the path of the emitted ions. Traditional wisdom was that an extractor grid must be positioned above the emitter tips, as such positioning is required to enforce an electric field with sufficient magnitude and direction to induce ion emission and thus thrust. Applicants performed detailed calculations and experimental measurements and found that, contrary to traditional wisdom, a geometry in which the extractor grid is placed beneath the emitter tips and thus out of the path of the emitted ions could still produce an electric field direction and magnitude sufficient for ion emission. Without grid impingement, the thrust produced by the electrospray thruster is increased and thruster operational lifetime is increased substantially. Additionally, this non-traditional geometry also allows for higher electric fields at the emitter tip for a given applied voltage, thus enabling lower operational voltage of the electrospray thruster as compared to conventional designs. Thus, Applicants disclose a electrospray thruster having a unique geometry that maintains the advantages of current electrospray thrusters while at the same time eliminating the primary failure mechanism of these devices.

SUMMARY OF THE INVENTION

The present invention relates to electrospray thrusters, processes of making electrospray thrusters, and methods of using such electrospray thrusters. Applicant's thruster incorporates a unique geometry for the emitters and extractor grid that effectively eliminates ion interception on the grid, which is the primary failure mechanism of current devices, yet maintains the electric field conditions necessary for ion emission to occur. Without grid impingement, the thrust produced by the electrospray thruster is increased and thruster operational lifetime is increased substantially. Additionally, this non-traditional geometry also allows for higher electric fields at the emitter tip for a given applied voltage, thus enabling lower operational voltage of the electrospray thruster as compared to conventional designs.

Additional objects, advantages, and novel features of the invention will be set forth in part in the description that follows, and in part will become apparent to those skilled in the art upon examination of the following or may be learned by practice of the invention. The objects and advantages of the invention may be realized and attained by means of the instrumentalities and combinations particularly pointed out in the appended claims.

BRIEF DESCRIPTION OF THE DRAWINGS

The patent or application file contains at least one drawing executed in color. Copies of this patent or patent application publication with color drawing(s) will be provided by the Office upon request and payment of the necessary fee.

The accompanying drawings, which are incorporated in and constitute a part of this specification, illustrate embodiments of the present invention and, together with a general description of the invention given above, and the detailed description of the embodiments given below, serve to explain the principles of the present invention.

It should be understood that the appended drawings are not necessarily to scale, presenting a somewhat simplified representation of various features illustrative of the basic principles of the invention. The specific design features of the sequence of operations as disclosed herein, including, for example, specific dimensions, orientations, locations, and shapes of various illustrated components, will be determined in part by the particular intended application and use environment. Certain features of the illustrated embodiments have been enlarged or distorted relative to others to facilitate visualization and clear understanding. In particular, thin features may be thickened, for example, for clarity or illustration.

DETAILED DESCRIPTION OF THE INVENTION

Definitions

Unless specifically stated otherwise, as used herein, the terms "a", "an" and "the" mean "at least one".

As used herein, the terms "include", "includes" and "including" are meant to be non-limiting.

Unless otherwise noted, all component or composition levels are in reference to the active portion of that component or composition, and are exclusive of impurities, for example, residual solvents or by-products, which may be present in commercially available sources of such components or compositions.

All percentages and ratios are calculated by weight unless otherwise indicated. All percentages and ratios are calculated based on the total composition unless otherwise indicated.

It should be understood that every maximum numerical limitation given throughout this specification includes every lower numerical limitation, as if such lower numerical limitations were expressly written herein. Every minimum numerical limitation given throughout this specification will include every higher numerical limitation, as if such higher numerical limitations were expressly written herein. Every numerical range given throughout this specification will include every narrower numerical range that falls within such broader numerical range, as if such narrower numerical ranges were all expressly written herein.

Thruster Design and Operation

Figure 1:
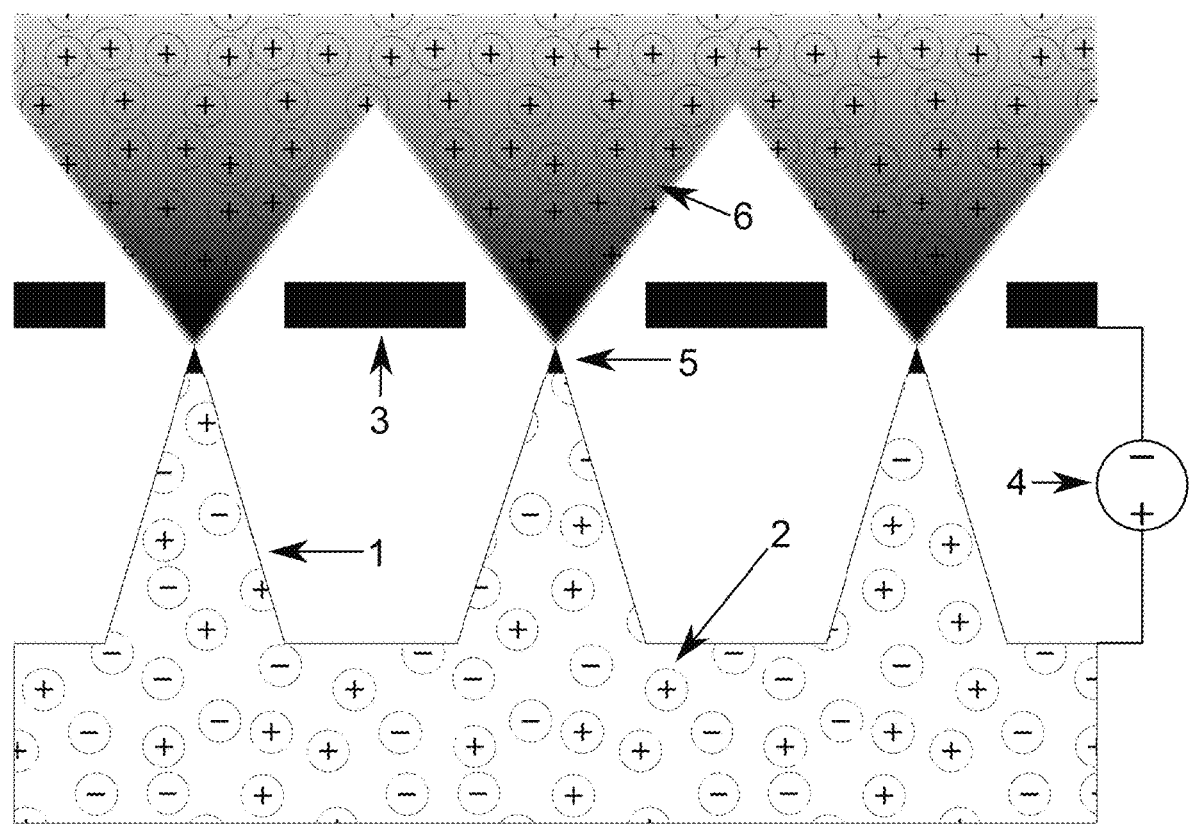
FIG. 1 is a schematic displaying the underlying principles of operation of a passively-fed, porous-media-based, liquid ion electrospray thruster.

The underlying principles of operation of a passively-fed, porous-media-based, liquid ion electrospray thruster is shown in FIG. 1. Here, a series of sharp features called emitters 1 are fabricated out of a porous material in which the open pore volume has been filled with an ionic liquid 2. Placed directly above the emitters is an extractor electrode 3, which consists of a thin conductive material with openings centered on each emitter to allow extraction and acceleration of the ions from the ionic liquid.

With the geometric arrangement as in FIG. 1, a high-voltage power supply is then used to enforce a potential difference between the extractor electrode and the ionic liquid within the emitters 4. Since the ionic liquid is composed of charged ions, it responds to the electric field produced by this potential difference and is pulled away from the porous emitter surface towards the extractor electrode. With a sufficiently high electric field, an equilibrium between the outward pull of the electric field pressure and the inward pull of the liquid surface tension can be maintained, resulting in the formation of one or more cones of ionic liquid known as Taylor cones 5 at the tip of each emitter. Because the emitter tips act to focus the electric field, sharper emitter tips allow Taylor cone formation at lower voltages.

Once a Taylor cone has been established, further increasing the electric field leads to evaporation of ions and ionic-molecules from the ionic liquid. Once evaporated, the ions are accelerated by the electric field through the extractor apertures and away from the emitters, thus producing thrust 6. As the ions are ejected, capillary forces pull new propellant up through the small pores to the emitters, allowing for a purely passive feed system with no pressure vessels or moving parts. While FIG. 1 shows the emission of positive ions, negative ion emission may be similarly achieved by flipping the high voltage power supply 4 such that the electric field points towards the emitters rather than away from it. Using this technique, the emitted ion polarity may be alternated dynamically to allow charge neutralization and for both species within the ionic liquid propellant to be used.

The primary issue facing electrospray thrusters is that the lifetimes currently achieved are small compared to those necessary for the majority of in-space operations. This lifetime is primarily limited by impingement of the emitted ions upon the extractor grid electrode, which in-turn results in material deposition upon the extractor grid surface. This grid impingement dramatically reduces the performance of the electrospray thruster since no thrust is produced by the impinged ions. More significantly, over time the material deposition resulting from the impingement becomes sufficient to form a conductive path between one or more emitters and the extractor grid, making it no longer possible to enforce a potential difference between them and therefore resulting in thruster failure.

The invention described herein provides a solution to the problem of grid impingent by utilizing a different geometry for the emitters and extractor grid in which ion impingement upon the grid may be effectively eliminated. Without grid impingement, the thrust produced by the electrospray thruster is increased and thruster operational lifetime is increased substantially. Additionally, this non-traditional geometry also allows for higher electric fields at the emitter tip for a given applied voltage, thus enabling lower operational voltage of the electrospray thruster as compared to conventional designs.

For comparison purposes, example calculations showing various aspects of a traditional geometry single emitter electrospray device are shown in FIGS. 2A-2D. These two-dimensional calculations were done using a cylindrical coordinate system in the radial and axial directions and assume angular symmetry about the axis along the radius of zero. For this reason, only the positive radial coordinates are shown, with the full three-dimensional solution visualized by revolving the shown two-dimensional solution cylindrically around the zero-radius axis. It should be noted that while the calculations shown in FIGS. 2A-2D are intended to be used as just one example of many possible conditions, the specific geometry and conditions shown have been tested experimentally and were indeed found to be sufficient to produce ion emission.

Figure 2A:
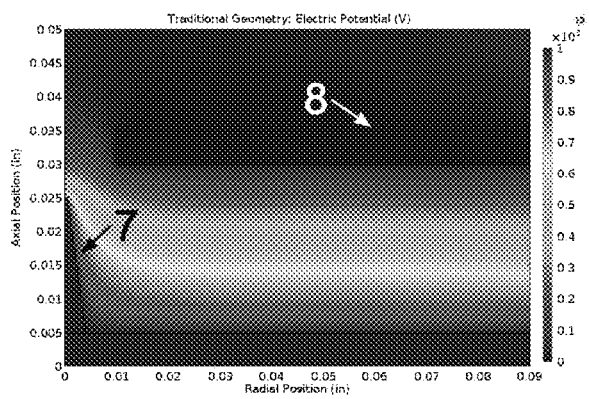
FIG. 2A is the calculated electric potential for a traditional geometry single emitter electrospray device.

FIG. 2A shows the calculated electric potential produced by a single emitter 7 using the traditional geometry in which the extractor electrode 8 is placed above the tip of the emitter. For this example and those that follow, the shape of the emitter was held constant to allow for consistent comparison, though a variety of emitter shapes are possible. Here, the emitter 7 is electrically biased to 1000 volts and the extractor electrode 8 is held at zero volts, with the resulting values of the electric potential at each point in space indicated by the color axis.

Figure 2B:
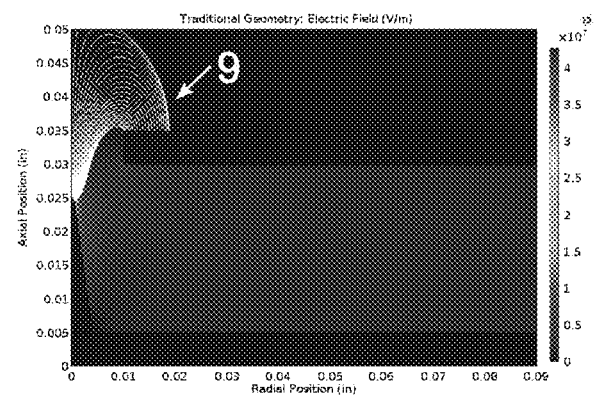
FIG. 2B is the calculated electric field for a traditional geometry single emitter electrospray device.

Shown in FIG. 2B is the calculated electric field produced using the geometry and voltages described above. Here it is seen that the electric field near the emitter tip is considerably larger than anywhere else on the device. Also shown by 9 are the electric field streamlines which show the direction of the electric field lines emanating from the tip of the emitter.

Figure 2C:
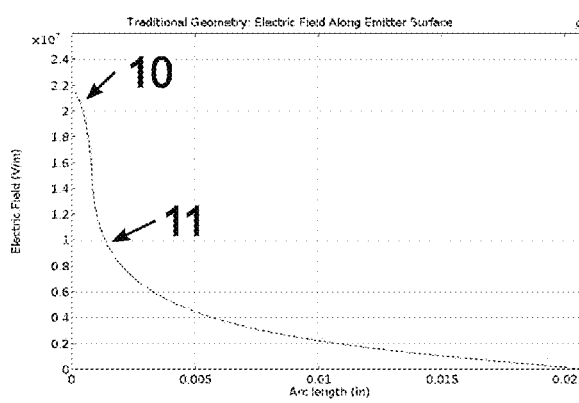
FIG. 2C is the calculated electric field along the emitter surface for a traditional geometry single emitter electrospray device.

The calculated electric field strength along the emitter surface is shown in FIG. 2C, where the portion of the surface along the radius of curvature 10 is highlighted in red to indicate the most likely ion emission region, and the conical portion of the emitter surface 11 is shown in blue. Here it is seen that the electric field is large at the tip of the emitter in order to induce ion emission, however it falls off rapidly along the lower surface of the emitter to ensure no emission occurs in along the side of the emitter.

Figure 2D:
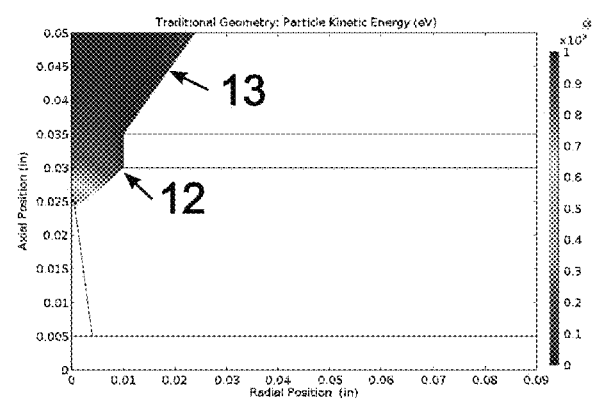
FIG. 2D is an example of the trajectories and kinetic energies of emitted particles for a traditional geometry single emitter electrospray device.

An example of possible ion trajectories and kinetic energies for this traditional geometry electrospray device is shown in FIG. 2D. Here it is seen that the ions are accelerated from the tip of the emitter over a range of angles and the ions that are emitted at high angular divergence impinge upon the extractor electrode 12. These impinged ions reduce the thrust produced by the device since only the ions that emit at a narrow enough angle are able to escape the electrospray thruster and produce thrust 13. Additionally, this process serves as the primary life-limited mechanisms of these devices since it results in conductive fluid deposition upon the extractor electrode.

Shown in FIGS. 3A-3D are the same calculations discussed above, however in this case they are done using an alternative geometry in which the relative positions of the emitter tips and that of the extractor electrode is inverted, thus allowing the extractor to be placed outside the path of the emitted ions. This geometry at first seems counter-intuitive, since the electric field would be expected to be directed downward from the emitter tip towards the extractor grid when the emitters are biased positively, thus not providing the correct direction or magnitude electric field for positive ion emission. The calculations shown in FIGS. 3A-3D suggest that, contrary to intuition, this "inverted geometry" does indeed provide an electric field of sufficient magnitude and direction to induce ion emission.

Figure 3A:
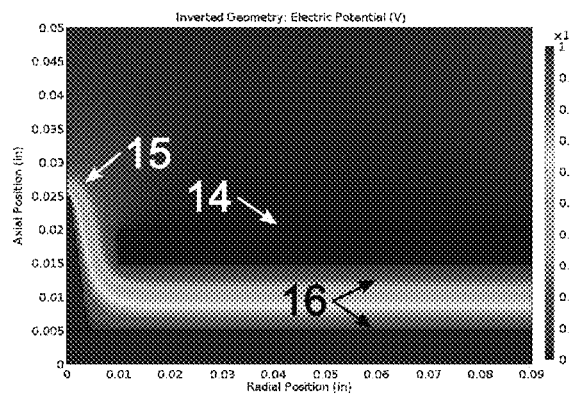
FIG. 3A is the calculated electric potential for an inverted geometry single emitter electrospray device.

FIG. 3A shows the calculated electric potential for a single emitter using the inverted geometry. Here it is seen that the extractor grid 14 is placed such that the tip of the emitter 15 protrudes through the grid aperture. An important consideration with this geometry is that the distance between the extractor grid and the emitter base platform 16 must be large enough to prohibit dielectric breakdown of the intervening medium. The specific minimum separation necessary depends on the dielectric strength of the material used in this region, as well as the intended operational voltage of the electrospray thruster.

Figure 3B:
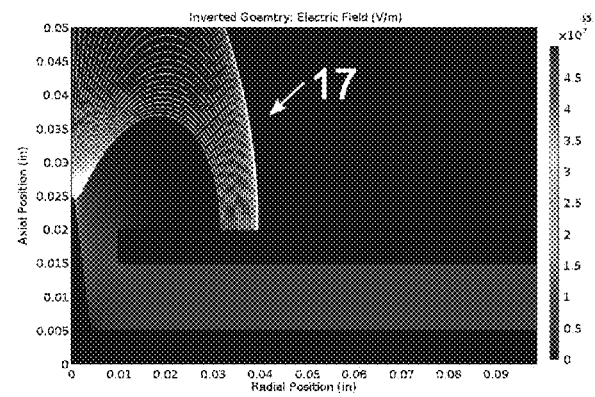
FIG. 3B is the calculated electric field for an inverted geometry single emitter electrospray device.

The calculated electric field for this inverted geometry is shown in FIG. 3B. As in the case of the traditional geometry, the electric field is shown to be highest at the emitter tip. Also shown here are the electric field streamlines 17 that flow between the emitter tip and the extractor grid. These streamlines show that even though the extractor grid is positioned below the emitter tip, the force due to the electric field is still directed away from the electrospray thruster for some distance before turning around and returning to the extractor grid. Because of this, a sufficiently massive particle emitted from the tip would be accelerated away from the electrospray thruster as desired.

Figure 3C:
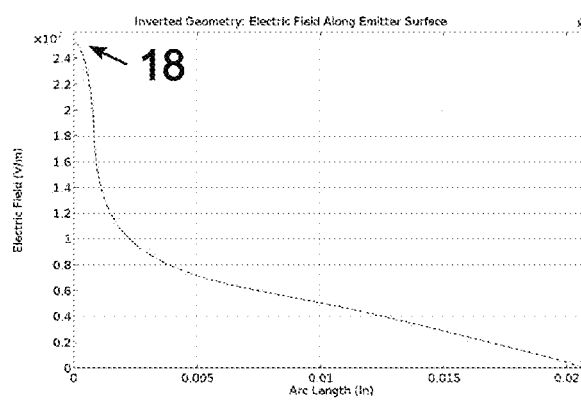
FIG. 3C is the calculated electric field along the emitter surface for an inverted geometry single emitter electrospray device.

The calculated electric field strength along the surface of the emitter is shown in FIG. 3C. Comparing the value of the electric field at the emitter tip using this inverted geometry 18 to that shown previously for the traditional geometry case 10 shows that the electric field is of a larger magnitude in the inverted geometry case. This suggests that if ion emission was successful under the traditional geometry conditions, then it would also be successful using this inverted geometry. Further, since these calculations suggest that the electric field magnitude at the emitter tip is larger than in the traditional geometry case, they imply that emission could also be achieved at lower operational voltages.

Figure 3D:
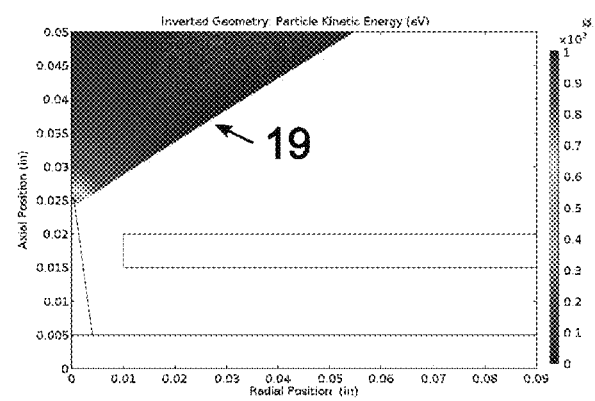
FIG. 3D is an example of the trajectories and kinetic energies of emitted particles for an inverted geometry single emitter electrospray device.

Finally, shown in FIG. 3D is an example of the possible trajectories and kinetic energies of the ions emitted using the inverted geometry. Here it is seen that, unlike the case of the traditional geometry, all emitted ions follow unobstructed paths away from the electrospray thruster 19. The complete lack of ion interception upon the executor grid when using this geometry would enable higher thrust to be produced by the electrospray thruster, as well as completely eliminate the primary failure mechanism of these devices.

Additional theoretical calculations similar to those shown above suggest that the specific details regarding the emitter and extractor grid geometries do not have a strong effect on the ultimate performance of the device, provided certain criterial are met. For example, calculations suggest that the position of the extractor grid relative to the emitter tip does not significantly affect performance, provided that the emitter tip is protruded above the top surface of the grid by at least a few times the emitter radius of curvature. Preferably, the emitter tip be positioned above the top surface of the extractor grid by a distance on the order of 10 times the emitter radius of curvature to ensure ions are not emitted from the side of the emitter and into the extractor grid aperture. Placing the extractor grid further below the emitter tip results in a small reduction in the electric field at the tip and so would lead to slightly higher start-up voltages.

Similarly, adjusting the extractor grid aperture sized does not a significantly effect on the overall results provided the aperture is sufficiently large to prohibit arcing between the emitter and the extractor grid. Smaller aperture sizes result in slightly higher electric fields at the tips but at the cost of increased electric fields along the body and therefore increased chance of side emission. Additionally, unlike in traditional electrospray thrusters, the thickness of the extractor grid does not appear to significantly affect either the electric field or the percentage of impinged ions upon the grid surface. Due to this, thicker extractor grids may be used with the inverted geometry than those with traditional geometries without impacting performance. This added benefit typically enables flatter extractor grids to be constructed due to the increased thickness of the allowable material.

Figure 4A:
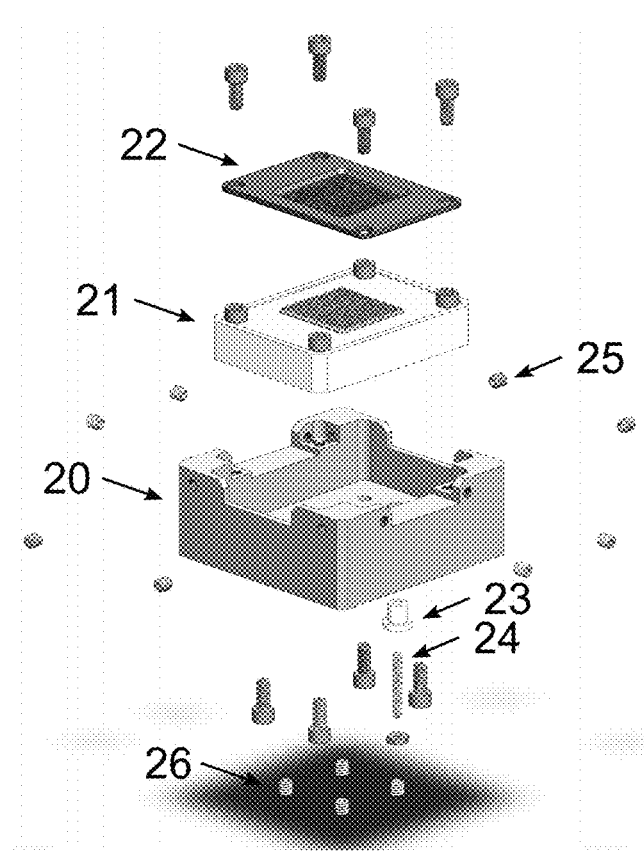
FIG. 4A is an exploded isometric view of the primary assemblies of one embodiment of an inverted geometry electrospray thruster.

One embodiment of an inverted geometry, porous-media-based electrospray thruster is shown in FIG. 4A. The primary components of the electrospray thruster consist of a thruster housing 20, a propellant module 21, and an extractor grid electrode 22. The housing provides localization and adjustability of the various thruster components, while the propellant module contains all components that interact with the propellant, including the emitters. Other important components include a high voltage isolator 23 and high voltage pin 24 that allows a high voltage to be applied to the propellant within the propellant module.

In order to allow the alignment and height adjustment of the emitters relative to the extractor grid, a series of 12 set screws are used. Eight set screws around the top of the housing 25 allow the extractor grid apertures to be aligned with the emitters, while the additional 4 set screws on the bottom of the housing 26 allow the height of emitters to be adjusted. These adjustments are critical to the inverted geometry since the emitters must be protruded through the gird apertures without breaking the tips through collisions with the grid.

Figure 4B:
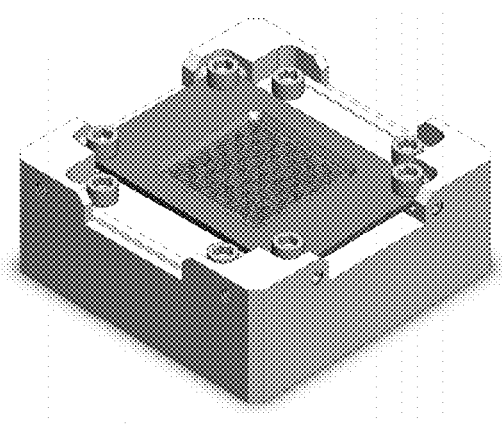
FIG. 4B is an isometric view of the top of one embodiment of an assembled inverted geometry electrospray thruster.
Figure 4C:
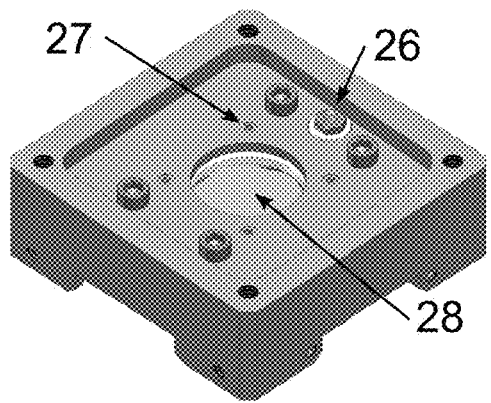
FIG. 4C is an isometric view of the bottom of one embodiment of an assembled inverted geometry electrospray thruster.

Also shown in FIG. 4B and FIG. 4C are an isometric view of the top and bottom of the assembled electrospray thruster, respectively. The underside of the electrospray thruster shows the high voltage pin connection 26 as well as the 4 set screws used for emitter height adjustment 27. Also shown is a large opening 28 that allows the propellant to be loaded directly into the propellant module from the rear of the electrospray thruster.

Figure 5A:
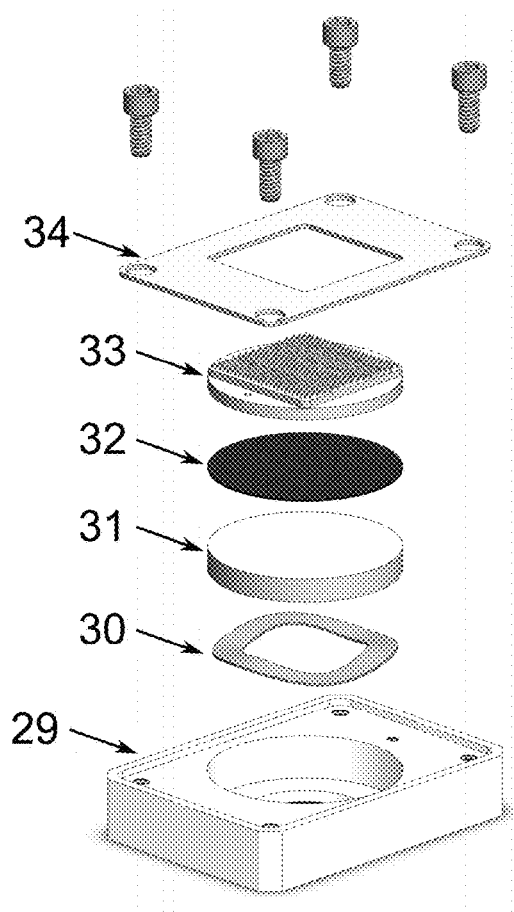
FIG. 5A is an exploded isometric view of one embodiment of the propellant module of an inverted geometry electrospray thruster.

An exploded view of the propellant module is shown in FIG. 5A. The propellant module consists of a module housing 29, a compression spring 30, a porous propellant reservoir 31, a porous interface layer 32, a porous emitter array 33, and a distal electrode 34. Once assembled, the distal electrode 34 compresses the components against the compression spring 30 in order to provide hydraulic connection between the various porous layers and therefore allow propellant flow between them. The distal electrode is also electrically connected to the high voltage pin 24 as well as any propellant within the emitters 33, and so provides a method of electrically biasing the propellant during operation.

In the embodiment shown, the propellant is entirely contained within the porous reservoir 31, interface layer 32, and emitters 33. This allows all propellant to be entirely contained within the electrospray thruster and thus removes the need for a pressurized propellant tank or valves. Additionally, the pore sizes of these components are chosen such that there exists a pore gradient, with the smallest pores in the emitter layer and the largest within the reservoir. This pore gradient provides a stronger capillary force towards the emitters and so allows for a passive feed system in which the propellant depleted by ion emission is replenished by propellant from beneath, thus eliminating the need for an actively controlled feed system.

Figure 5B:
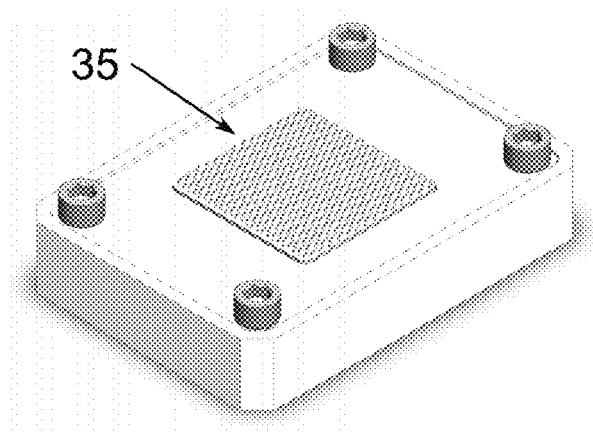
FIG. 5B is an isometric view of the top of one embodiment of an assembled propellant module for an inverted geometry electrospray thruster.
Figure 5C:
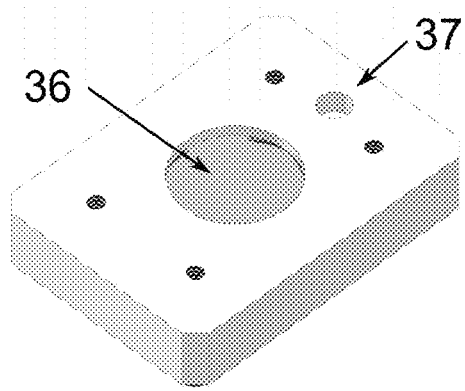
FIG. 5C is an isometric view of the bottom of one embodiment of an assembled propellant module of an inverted geometry electrospray thruster.

The top and bottom of an assembled propellant module is shown in FIGS. 5B and 5C, respectively. One important note is that in order for the emitters to be protruded through the extractor grid apertures for the inverted geometry, the emitter platform must extend above the surface of the distal electrode as shown in 35. Also seen on the real of the propellant module is the hole 37 to allow the high voltage isolator 23 and pin 24 to be inserted through the housing and into the distal electrode 34. Additionally, a large hole on the rear of the propellant module 36 allows propellant to be loaded directly into the reservoir from the rear of the assembled electrospray thruster.

Figure 6A:
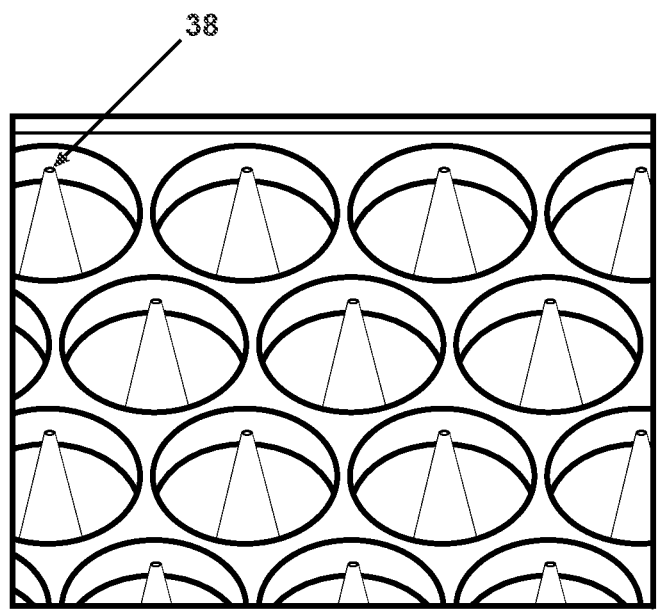
FIG. 6A is a close-up 45 degree angled digital microscope image of the emitters and extractor grid of an inverted geometry electrospray thruster.
Figure 6B:
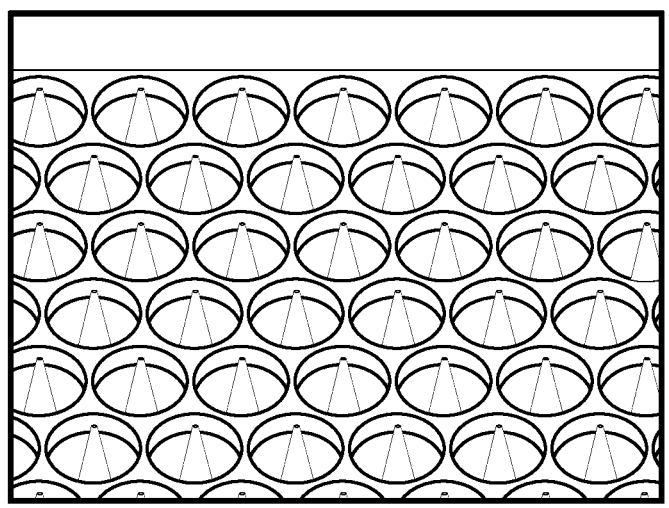
FIG. 6B is a far-away 45 degree angled digital microscope image of the emitters and extractor grid of an inverted geometry electrospray thruster.

Microscope images of several emitters installed into a thruster using the inverted geometry are shown in FIGS. 6A and 6B. In this embodiment, the emitters 38 can be seen to extend above the top surface of the 127 micron thick extractor grid by approximately 127 microns. Electrospray thrusters utilizing this new inverted geometry have now been tested successfully for over 500 hours of operation and shown to yield lower start-up voltages and lower grid interception compared with the previous generation of traditional geometry electrospray thrusters.

While the inverted geometry design could be made to function with a variety of differing emitter shapes, including those used in traditional geometry electrospray thrusters, several important considerations exist which are unique to the inverted geometry design. One of the unique requirements placed on the emitters when using the inverted geometry is that the emitter height must be larger than that required of traditional geometry thrusters. In traditional electrospray thrusters, the height of the emitters must be at least many times the radius of curvature of the emitter tip to ensure the electric field is concentrated at the tip. While this is also true for emitters used with the inverted geometry, there is the additional requirement that the emitters be tall enough to protrude through the apertures of the extractor grid. For this reason, the minimum emitter height depends upon the extractor grid height and thickness.

Another design consideration for emitters used with the inverted geometry is that there should be no sharp features along its structure aside from the tip. Since a portion of the emitter sits within the extractor grid aperture, there is the potential for a strong electric field to exist between the surface of the emitter body and the inside of the grid aperture. This electric field must be kept below the critical magnitude to induce ion emission, otherwise ions could be emitted directly into the inside of the extractor aperture. Provided the emitter body is sufficiently smooth, the electric field will not reach the critical threshold for this to occur.

Aside from the specific unique requirements listed above, emitters used for the inverted geometry ideally satisfy the same requirements as those used in traditional porous-media-based electrospray thrusters. Specifically, the tips should have as small a radius of curvature as possible in order to allow the narrowest emission angles and the lowest operational voltages. Additionally, if maximum thrust is desired, the highest number of emitters possible per unit area should be used. This can be improved by decreasing the spacing between the emitter tips, as well as by arranging them in a pattern that improves packing efficiency such as staggering the emitters.

Applicants disclose an electrospray thruster, said electrospray thruster comprising:
  a) an emitter array having a platform composed of emitters, each emitter having a body and a tip; and
  b) an extractor grid having a lower surface, an upper surface and cylindrical apertures from said lower surface to said upper surface, said extractor grid being positioned such that each said emitter tip protrudes through one of said grid's apertures and each said emitter tip being centered in its respective aperture, preferably each said emitter tip protrudes through one of said grid's apertures from about 3 times the radius of curvature of said emitter tip to about 20 times the radius of curvature of said emitter tip, more preferably each said emitter tip protrudes through one of said grid's apertures from about 5 times the radius of curvature of said emitter tip to about 15 times the radius of curvature of said emitter tip, most preferably each of said emitter tip protrudes through one of said grid's apertures from about 8 times the radius of curvature of said emitter tip to about 12 times the radius of curvature of emitter said tip;

and the distance between said extractor grid's lower surface and said platform's surface on which said emitters are disposed generates an arc index of zero or less.

Applicants disclose an electrospray thruster according to Paragraph 0060, wherein each emitter body contains no features sharper than 5 times the radius of curvature of the tip, preferably wherein each emitter body contains no features sharper than 10 times the radius of curvature of the tip, more preferably wherein each emitter body contains no features sharper than 20 times the radius of curvature of the tip.

Applicants disclose an electrospray thruster according to Paragraphs 0060 through 0061 wherein each of said emitters have an outer conical surface, said outer conical surface having a fixed, constant angle with respect to said tip.

Applicants disclose an electrospray thruster according to Paragraph 0062 wherein said fixed constant angle deviates across said conical surface by no more than 6 degrees, preferably by no more than 3 degrees, more preferably by no more than 1 degree.

Applicants disclose an electrospray thruster according to Paragraphs 0060 through 0063, wherein said emitters are staggered.

Applicants disclose an electrospray thruster according to Paragraphs 0060 through 0064, said emitter array has an emitter density of 2 emitters per square centimeter to about 1100 emitters per square centimeter, preferably said emitter array has an emitter density of 350 emitters per square centimeter to about 1100 emitters per square centimeter, more preferably said emitter array has an emitter density of 500 emitters per square centimeter to about 1100 emitters per square centimeter, most preferably said emitter array has an emitter density of 700 emitters per square centimeter to about 1100 emitters per square centimeter.

Applicants disclose an electrospray thruster according to Paragraphs 0060 through 0065, wherein said emitter array comprises a porous material, preferably said porous material has a pore size of 100 nanometers to less than one micron, preferably said porous material is an insulator, preferably said emitter array comprises a material selected from the group consisting of porous borosilicate glass, porous ceramics, porous xerogel, and porous aerogel, more preferably said emitter array comprises a material selected from the group consisting of porous borosilicate glass, porous ceramics, most preferably said emitter array comprises porous borosilicate glass. Suitable porous borosilicate glass material may be purchased from Adams and Chittenden Scientific Glass, located at 2741 Eighth Street, Berkeley, Ca 94710. Preferably, said glass has a pore size of 1-1.6 micrometers that is classified as P5.

Applicants disclose an electrospray thruster according to Paragraph 0060, wherein each emitter tip is centered in its respective aperture such that said emitter tip's center position deviates no more than 100 microns from said aperture's true center, preferably said emitter tip's center position deviates no more than 50 microns from said aperture's true center, more preferably said no more than 25 microns from said aperture's true center.

Applicants disclose an electrospray thruster, according to Paragraph 0060, said liquid ion electrospray thruster comprising a thruster housing, a multi-component propellant module, and an extractor electrode said propellant module and extractor electrode sitting within said thruster housing, said extractor electrode being positioned above said multi-component propellant module.

Applicants disclose an electrospray thruster, according to Paragraph 0068, wherein said thruster housing comprises adjustments:
a) to set emitter tip protrusion distance through said extractor grid's apertures; and/or
b) to set emitter tip centering in said extractor grid's apertures.

Applicants disclose a space vehicle comprising an electrospray thruster according to Paragraphs 0060 through 0069. In one aspect, said space vehicle may be a satellite. In one aspect, said satellite is selected from the group consisting of CubeSats, microsatellites, and nanosatellites.

Process of Making and Using the Thruster

Once all of the components for the inverted geometry thruster are fabricated and the propellant module 21 is assembled, the remaining thruster components may be assembled and aligned within the housing 20. Due to the unique geometry of the thruster, special care must be taken during final assembly to properly align and adjust the emitters so they protrude through the extractor grid without damage.

First, the assembled propellant module 21 must be placed within the housing 20 with the emitter height adjustment set screws 26 fully retracted to allow the propellant module to sit flat against the thruster housing. A digital microscope can then be used to verify that the heights of the emitter tips are below the mounts for the extractor grid to ensure that grid installation will not come into contact with the emitters. Once this is verified, the extractor grid electrode 22 may be loosely installed within the housing.

With the extractor electrode loosely installed within the housing, the extractor alignment set screws 25 are adjusted under a digital microscope until the extractor grid motion is constrained such that the apertures would not overlap the position of any emitters. Since the emitter tips are beneath the extractor grid, as verified previously, contact between the emitters and extractor grid during this step will not occur.

With the grid now roughly aligned with the emitters and the set screws adjusted to ensure that no contact with the tips will occur, the emitter heights may be adjusted. The emitter height set screws 26 are now adjusted until the emitters are raised through the apertures of the extractor grid to the desired height, as measured using the digital microscope. For the embodiment discussed here, the emitter tips are raised approximately 127 microns above the top surface of the extractor grid. Care must be taken that the emitter height set screws are adjusted slowly and uniformly so as to not angle the emitters into the extractor grid. Ideally, the difference between the heights of the four corners of the emitter platform should not exceed 100 microns to ensure the tips are not raised at an angle, with the final heights preferably consistent to 25 microns.

With the final adjustments to the emitter heights complete, the final alignment of the extractor grid may be done. The extractor grid should now be aligned under a digital microscope such that the best possible alignment between the emitter tips and the extractor apertures is achieved across all emitters. Once final alignment is complete and all fasteners are secured, the assembled and aligned thruster is ready for propellant loading.

Prior to loading, it is preferred that the propellant be "outgassed" by placing it within a vacuum chamber at a pressure of $10^{-5}$ Torr or lower for sufficient time that all pre-existing volatile contaminants are removed. Once this process has been completed, the outgassed propellant may then be placed within the desired fluid delivery apparatus, such as a syringe pump or pressure-over-fluid system.

Preferably, loading of the inverted geometry thruster is done within a vacuum chamber at a pressure no larger than $10^{-5}$ Torr to ensure water adsorption and other contaminants are not introduced into the propellant during the loading operation. The thruster is placed under such a vacuum along with the fluid delivery apparatus containing the outgassed propellant. For the primary embodiment discussed here, the thruster should be orientated upside down such that the propellant loading opening on the rear 28 is situated beneath the fluid delivery apparatus.

Once a vacuum pressure of $10^{-5}$ Torr or less is obtained, the propellant may dripped directly onto the porous reservoir through the propellant loading opening 28. Traditionally, porous-media-based electrospray thrusters are loaded from the top by dripping the propellant directly onto the emitter array rather than from the bottom as described here. This was done to ensure that the emitters are fully saturated with propellant during the loading process. However, this loading process requires the removal of the extractor grid during loading to expose the emitter array. This disadvantage then requires the loaded thruster to be removed from vacuum and exposed to atmosphere while the extractor grid is aligned and installed, which introduces significant debris and allows water adsorption into the propellant from the atmosphere. The rear loading approach described here allows the entire thruster assembly and alignment to be accomplished prior to loading and so significantly minimizes propellant exposure and contamination. This is particularly important for an inverted geometry thruster, which requires more careful alignment and adjustment of the emitters relative to the extractor grid and so is better done dry rather than with a loaded thruster. Tests have shown that loading from the reservoir still leads to full saturation of the emitter layer once equilibrium of the propellant within the thruster is complete.

Preferably, the loaded thruster is to be operated within a vacuum chamber at a pressure not greater than $10^{-5}$ Torr to ensure sufficient dielectric strength of the local environment such that arcing between the emitters and extractor grid does not occur. Operation is accomplished by enforcing a potential difference between the propellant within the emitters and the extractor grid of sufficient magnitude to induce ion emission.

For the embodiment shown in FIGS. 4A-4C, the output from a high-voltage supply or amplifier is connected to the high-voltage pin 24 and the extractor grid electrode 22 connected to ground. Since the extractor grid 22 is electrically tied to the thruster housing 20, the extractor may be connected using one of the threaded holes on the rear of the thruster housing (refer to FIG. 4C). Preferably, the extractor grid is connected to ground through an ammeter that allows the ion current impinged upon the extractor grid to me measured.

With the conditions as prescribed, the thruster may be operated by electrically biasing the propellant within the emitters to a sufficient positive value to induce positive ion emission or a sufficient negative value to induce negative ion emission. The threshold for emission depends on the propellant used as well as the geometry and separation of the emitters and extractor grid. For the embodiment shown in FIGS. 4A-4C, operated on 1-Ethyl-3-methylimidazolium tetrafluoroborate (EMI-BF4) ionic liquid propellant, typical start-up voltages are as low as +/−800 volts, with increased voltage resulting in increased ion current emitted from the device.

Applicants disclose a process of making an emitter array is also disclosed, said process comprising:
a) machining a porous borosilicate glass work piece sufficiently such that a platform that extends above said porous borosilicate glass work piece's base is obtained.
b) removing, via machining, a portion of the surface of the platform using a miniature tapered square end mill following a helical tool path to expose a conical emitter and optionally repeating said removable process one or more times. In the process of this Paragraph 0082 for elements a) and/or b) said machining may comprise milling, said milling may comprise CNC machining, and said CNC machine may be capable of achieving a spindle speed of 50,000 rpm. In one aspect of the process of this Paragraph 0082, elements and/or b) are repeated one or more times. Suitable miniature tapered square end mills can be obtained from Harvey Tool Company located at 428 Newburyport Turnpike, Rowley, Mass. 01969. Suitable end mills include end mills having a tip diameter between 0.005 inch and 0.015 inch and a taper of 5 degrees to 15 degrees along with a coating of Aluminum Titanium Nitride Nano (AlTin Nano).

Applicants disclose a process of making an emitter array according to Paragraph 0082 is disclosed, said process comprising placing said porous borosilicate glass work piece in a fixture prior to machining said porous borosilicate glass work piece. In one aspect, the fixture holding said porous borosilicate glass work piece is placed in vise, said vise being a part of a machining device. In such process said machining may comprise milling, said milling may comprise CNC machining, and said CNC machine may be capable of achieving a spindle speed of 50,000 rpm.

Applicants disclose a process for making an electrospray thruster, said process comprising assembling a thruster comprising:
a) an emitter array having a platform composed of emitters, each emitter having a body and a tip; and
b) an extractor grid having a lower surface, an upper surface and cylindrical apertures from said lower surface to said upper surface, said extractor grid being positioned such that each said emitter tip protrudes through one of said grid's apertures and each said emitter tip being centered in its respective aperture, preferably each said emitter tip protrudes through one of said grid's apertures from about 3 times the radius of curvature of said emitter tip to about 20 times the radius of curvature of said emitter tip, more preferably each said emitter tip protrudes through one of said grid's apertures from about 5 times the radius of curvature of said emitter tip to about 15 times the radius of curvature of said emitter tip, most preferably each of said emitter tip protrudes through one of said grid's apertures from about 8 times the radius of curvature of said emitter tip to about 12 times the radius of curvature of emitter said tip; and the distance between said extractor grid's lower surface and said platform's surface on which said emitters are disposed generates an arc index of zero or less.

Applicants disclose a process according to Paragraph 0084 wherein each tip is centered in its respective aperture such that said emitter tip's center position deviates no more than 100 microns from said aperture's true center, preferably said emitter tip's center position deviates no more than 50 microns from said aperture's true center, more preferably said no more than 25 microns from said aperture's true center.

Test Methods

The arc index represents the likelihood that two electrodes will produce an arc between them by dielectric breakdown of the intervening medium when a voltage is applied, where Arc Index=((Electrode Voltage)/(Dielectric Strength of Medium))−(Electrode Separation). An arc index of 0 or less represents a configuration in which arcing is not expected.

The radius of curvature of an emitter tip or feature is determined as follows:
A) Place the emitter array under a VHX-5000 digital optical microscope available from Keyence 500 Park Boulevard, Suite 200, Itasca, Ill. 60143, U.S.A.
B) Using the 200× magnification and integrated shape fitting software, fit a circle to the feature such that a portion of the circle follows the curvature of said feature. The radius of this fitted circle represents the radius of curvature of said feature.

Discrete Emitter Density is determined using a digital optical microscope as follows.
A) Place the emitter array under a digital optical microscope with a magnification capability of 200× and integrated distance measurement software. A suitable digital optical microscope is the VHX-5000 by Keyence.
B) Using the 200× magnification and integrated distance measurement software, measure the distances between each set of two adjacent emitter peaks within the emitter array. Sum all said distances and divide by the number of measurements to obtain the average distance between emitters. Said number is referred to as the Average Emitter Pitch.
C) Calculate the emitter density using the measured Averaged Emitter Pitch obtained in step (B) using the following relationship: For aligned emitter arrays, Emitter Density=1/(Average Emitter Pitch)^2. For staggered emitter arrays, Emitter Density=2/(sqrt(3)*(Average Emitter Pitch)^2).

EXAMPLES

The following examples illustrate particular properties and advantages of some of the embodiments of the present invention. Furthermore, these are examples of reduction to practice of the present invention and confirmation that the principles described in the present invention are therefore valid but should not be construed as in any way limiting the scope of the invention.

Example 1: An inverted grid geometry thruster is built on a CNC machine and assembled according to the embodiment shown in FIGS. 4A-4D and 5A-5D. The housing 20 is fabricated from 6061 aluminum and uses the set screw alignment and adjustment system shown in FIG. 4A. The extractor grid 22 is made from a 0.03 inch thick molybdenum frame bonded to a 0.005 inch thick molybdenum grid using Eccobond 56 epoxy. The extractor grid consists of 0.02 inch diameter apertures separated by 0.022 inches in a staggered geometry. The propellant module 21 consists of a module housing 29 fabricated out of PEEK, a stainless steel compression spring 30, a propellant reservoir 31 fabricated out of P4 borosilicate glass, an interface layer 32 made of Whatman Qualitative 1 filter paper, an emitter array 33 fabricated out of P5 borosilicate glass, and a distal electrode 34 made from titanium. The emitter array 33 consists of emitters in a staggered arrangement with the emitters separated by 0.022 inches. Each emitter is 0.02 inches tall and is straight conical in shape with a conical angle of 10 degrees. Once all of the components for the inverted geometry thruster are fabricated and the propellant module 21 is assembled, the remaining thruster components may be assembled and aligned within the housing. First, the assembled propellant module 21 must be placed within the housing 20 with the emitter height adjustment set screws 26 fully retracted to allow the propellant module to sit flat against the thruster housing. A digital microscope can then be used to verify that the heights of the emitter tips are below the mounts for the extractor grid to ensure that grid installation will not come into contact with the emitters. Once this is verified, the extractor grid electrode 22 may be loosely installed within the housing and the extractor alignment set screws 25 are adjusted under a digital microscope until the extractor grid motion is constrained such that the apertures would not overlap the position of any emitters. The emitter height set screws 26 are now adjusted until the emitters are raised through the apertures of the extractor grid so the tips of the emitters are at a height of approximately 0.005 inches above the top surface of the extractor gird, as measured using the digital microscope. This position places the bottom side of the 0.005 inch thick extractor grid 0.01 inches from the top surface of the emitter platform. When operated in high vacuum, which has an approximate dielectric strength of 500 volts per 0.001 inch, the calculated arc index for a thruster operated at 2000 V would be −6, and thus arcing is not expected under these conditions. The extractor grid is now aligned under a digital microscope such that the best possible alignment between the emitter tips and the extractor apertures is achieved across all emitters.

Example 2: An inverted grid geometry thruster is fabricated and assembled according to Example 1, however in this example the height of the emitters is chosen to be 0.015 inches. With the top surface of the 0.005 inch extractor again positioned 0.005 inches below the emitter tips, this places the bottom surface of the extractor 0.005 inches above the emitter platform, resulting in an arc index of −1 for a thruster operated in high vacuum at 2000 V.

Example 3: An inverted grid geometry thruster is fabricated and assembled according to Example 1, however in this example the height of the emitters is chosen to be 0.010 inches, the extractor grid is chosen to be 0.003 inches thick, and the emitters are chosen to stick out 0.003 inches above the top surface of the extractor grid. This arrangement places the bottom surface of the extractor 0.004 inches above the emitter platform, resulting in an arc index of 0 for a thruster operated in high vacuum at 2000 V.

Example 4: an inverted grid geometry thruster is fabricated and assembled according to Example 1, however in this example a spring is used to allow emitter height adjustment in place of the height adjustment set screws 26. In this embodiment, the spring is placed beneath the propellant module 21 and above the housing 20. The propellant module is then tightened against the spring using the bolts beneath the housing to allow the extractor grid to be installed and aligned, then the bolts beneath the housing are loosened to allow the propellant module height to be raised to the desired emitter height.

While the present invention has been illustrated by a description of one or more embodiments thereof and while these embodiments have been described in considerable detail, they are not intended to restrict or in any way limit the scope of the appended claims to such detail. Additional advantages and modifications will readily appear to those skilled in the art. The invention in its broader aspects is therefore not limited to the specific details, representative apparatus and method, and illustrative examples shown and described. Accordingly, departures may be made from such details without departing from the scope of the general inventive concept.

What is claimed is:

1. An electrospray thruster, said electrospray thruster comprising:
   a) an emitter array having a platform composed of emitters disposed on a surface of the platform, each emitter of the emitters having a respective body and a respective tip; and
   b) an extractor grid having a lower surface, an upper surface and cylindrical apertures from said lower surface to said upper surface, said extractor grid being positioned such that each tip protrudes through a respective aperture among the cylindrical apertures so as to protrude past the lower surface and to protrude past the upper surface, and wherein each tip is centered in a respective aperture among the cylindrical apertures; and
   a distance between said lower surface and said surface of the platform results in an arc index of zero or less.

2. The electrospray thruster according to claim 1, wherein each tip protrudes through the respective aperture among the cylindrical apertures from 3 times a radius of curvature of each tip to 20 times the radius of curvature of each tip.

3. The electrospray thruster according to claim 2, wherein each tip protrudes through the respective aperture among the cylindrical apertures from 5 times the radius of curvature of each tip to 15 times the radius of curvature of each tip.

4. The electrospray thruster according to claim 3, wherein each tip protrudes through the respective aperture among the cylindrical apertures from 8 times the radius of curvature of each tip to 12 times the radius of curvature of each said tip.

5. The electrospray thruster according to claim 1, wherein each body contains no features sharper than 5 times the radius of curvature of each respective tip.

6. The electrospray thruster according to claim 5, wherein each body contains no features sharper than 10 times the radius of curvature of each respective tip.

7. The electrospray thruster according to claim 6, wherein each body contains no features sharper than 20 times the radius of curvature of each respective tip.

8. The electrospray thruster according to claim 1 wherein each emitter of said emitters has a respective outer conical surface, each outer conical surface having a respective fixed, constant angle with respect to each respective tip.

9. The electrospray thruster according to claim 8 wherein each fixed constant angle deviates across said respective conical surface by no more than 6 degrees.

10. The electrospray thruster according to claim 9 wherein each fixed constant angle deviates across said respective conical surface by no more than 3 degrees.

11. The electrospray thruster according to claim 10 wherein each fixed constant angle deviates across said respective conical surface by no more than 1 degree.

12. The electrospray thruster according to claim 1, wherein said emitters are staggered.

13. The electrospray thruster according to claim 1, said emitter array has an emitter density of 2 emitters per square centimeter to 1100 emitters per square centimeter.

14. The electrospray thruster according to claim 1, wherein said emitter array comprises a porous material.

15. The electrospray thruster according to claim 1, wherein each tip is centered in the respective aperture among the cylindrical apertures such that a center position of each tip deviates no more than 100 microns from a true center of the respective aperture among the cylindrical apertures.

16. The electrospray thruster, according to claim 1, said thruster comprising a thruster housing, a multi-component propellant module, said propellant module and said extractor grid sitting within said thruster housing, said extractor grid being positioned above said multi-component propellant module.

17. The electrospray thruster, according to claim 16, wherein said thruster housing is adjustable:
   a) to set a tip protrusion distance through said cylindrical apertures; and/or
   b) to set tip centering in said cylindrical apertures.

18. A space vehicle comprising an electrospray thruster according to claim 1.

19. A process for making an electrospray thruster, said process comprising assembling the electrospray thruster comprising:
   a) an emitter array having a platform composed of emitters disposed on a surface of the platform, each emitter of the emitters having a respective body and a respective tip; and
   b) an extractor grid having a lower surface, an upper surface and cylindrical apertures from said lower surface to said upper surface, said extractor grid being positioned such that each tip protrudes through a respective aperture among the cylindrical apertures so as to protrude past the lower surface and to protrude past the upper surface, and wherein each tip is centered in the respective cylindrical aperture among the cylindrical apertures, and a distance between said lower surface and said surface of the platform results in an arc index of zero or less.

20. A process according to claim 19 wherein each tip is centered in the respective aperture among the cylindrical apertures such that a respective center position of each tip deviates no more than 100 microns from a respective true center of said respective aperture.

* * * * *